(12) United States Patent
Hongyo et al.

(10) Patent No.: US 11,594,993 B2
(45) Date of Patent: Feb. 28, 2023

(54) ROTARY MACHINE CONTROLLER, REFRIGERANT COMPRESSOR, REFRIGERATION CYCLE SYSTEM, AND AIR CONDITIONER

(71) Applicant: Mitsubishi Electric Corporation, Tokyo (JP)

(72) Inventors: Akane Hongyo, Tokyo (JP); Kenji Takahashi, Tokyo (JP); Kazunori Hatakeyama, Tokyo (JP); Akira Satake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 265 days.

(21) Appl. No.: 17/052,574

(22) PCT Filed: Jul. 18, 2018

(86) PCT No.: PCT/JP2018/026965
§ 371 (c)(1),
(2) Date: Nov. 3, 2020

(87) PCT Pub. No.: WO2020/016972
PCT Pub. Date: Jan. 23, 2020

(65) Prior Publication Data
US 2021/0242815 A1 Aug. 5, 2021

(51) Int. Cl.
*H02P 25/18* (2006.01)
*H02P 25/022* (2016.01)
(Continued)

(52) U.S. Cl.
CPC .......... *H02P 25/18* (2013.01); *H02P 21/0089* (2013.01); *H02P 25/022* (2013.01); *H02P 25/184* (2013.01); *H02P 25/24* (2013.01)

(58) Field of Classification Search
CPC ........ H02P 25/18; H02P 25/022; H02P 25/24; H02P 21/13; H02P 21/141; H02P 2205/07; H02P 25/184; H02P 21/0089
See application file for complete search history.

(56) References Cited

U.S. PATENT DOCUMENTS

| 11,201,576 B2* | 12/2021 | Toyodome ................ F24F 1/20 |
| 2011/0029179 A1* | 2/2011 | Miyazaki .............. B60L 15/007 |
| | | 701/22 |

(Continued)

FOREIGN PATENT DOCUMENTS

| JP | 2000-236700 A | 8/2000 |
| JP | 2008-148490 A | 6/2008 |
| JP | 2013-62888 A | 4/2013 |

OTHER PUBLICATIONS

International Search Report and Written Opinion dated Oct. 23, 2018 for PCT/JP2018/026965 filed on Jul. 18, 2018, 6 pages including English Translation of the International Search Report.

*Primary Examiner* — Bickey Dhakal
(74) *Attorney, Agent, or Firm* — Xsensus LLP

(57) ABSTRACT

A controller includes: a connection switch that switches a connection state of a winding of a synchronous motor during a rotating operation of the synchronous motor; a current detector that detects a rotary machine current flowing in the synchronous motor; a position/speed estimator that estimates a magnetic pole position and speed of a rotor; a voltage applicator that applies a voltage to the synchronous motor; and a control circuitry that generates a voltage command given to the voltage applicator on the basis of the magnetic pole position and the speed, and outputs a switching operation command for switching the connection state to the connection switch. The control circuitry generates the (Continued)

voltage command to bring the rotary machine current close to zero before the connection state of the winding is switched.

13 Claims, 9 Drawing Sheets

(51) Int. Cl.
  *H02P 25/24* (2006.01)
  *H02P 21/00* (2016.01)

(56) References Cited

U.S. PATENT DOCUMENTS

2020/0162009 A1* 5/2020 Hatakeyama ....... H02P 29/0241
2020/0307392 A1* 10/2020 Joseph .................... B60L 50/16

* cited by examiner

ROTARY MACHINE CONTROLLER, REFRIGERANT COMPRESSOR, REFRIGERATION CYCLE SYSTEM, AND AIR CONDITIONER

CROSS-REFERENCE TO RELATED APPLICATION

The present application is based on PCT filing PCT/JP2018/026965, filed Jul. 18, 2018, the entire contents of which are incorporated herein by reference.

FIELD

The present invention relates to a rotary machine controller that switches a connection state of windings of a rotary machine during a rotating operation, a refrigerant compressor, a refrigeration cycle system, and an air conditioner.

BACKGROUND

A rotary machine that switches a connection state of stator windings during a rotating operation has been known. Hereinafter, the stator windings will also be simply referred to as "windings". Patent Literature 1 discloses a technique that, in switching the windings, switches the connection state of the windings by turning off the output of an inverter and confirms the change in the connection state of the windings from a resistance value or an induced voltage after switching the connection state of the windings.

CITATION LIST

Patent Literature

Patent Literature 1: Japanese Patent Application Laid-open No. 2008-148490

SUMMARY

Technical Problem

The invention disclosed in Patent Literature 1 estimates the phase from the current flowing through a motor. The invention disclosed in Patent Literature 1 turns off the output of the inverter when switching the wiring state of the windings of the motor, switches the connection state of the windings, estimates the phase and the speed of the motor by resuming the output of the inverter to keep the motor current to zero, and then performs restart. However, the invention disclosed in Patent Literature 1 cannot estimate the phase while the output of the inverter is turned off, and thus takes time to estimate the phase by resuming the output of the inverter after switching the connection state of the windings. Since a device with a large load rapidly decelerates when the motor current is brought to zero, the motor may stop while the phase is being estimated, or may step out with the phase failing to be estimated correctly.

The present invention has been made in view of the above, and an object of the present invention is to provide a rotary machine controller that can switch a wiring state of windings quickly and stably during a rotating operation and continue operation even in a device with a large load.

Solution to Problem

In order to solve the above problem and achieve the object, the present invention includes: a connection switch that includes a switcher and that switches a connection state of a winding of a rotary machine by performing a switching operation of the switch during a rotating operation of the rotary machine; a current detector that detects a rotary machine current flowing in the rotary machine; a position/speed estimator that estimates a magnetic pole position and speed of a rotor of the rotary machine on the basis of the rotary machine current; a voltage applicator that applies a voltage to the rotary machine; and a control circuitry that generates a voltage command given to the voltage applicator on the basis of the magnetic pole position and the speed estimated by the position/speed estimator, and outputs a switching operation command for switching the connection state to the connection switch. The control circuitry: generates the voltage command to bring the rotary machine current close to zero before the connection state of the winding of the rotary machine is switched; and after the connection state of the winding of the rotary machine is switched, outputs an initial restoration speed determined on the basis of the estimated speed of the rotary machine before switching to the position/speed estimator. Upon receiving the initial restoration speed, the position/speed estimator replaces the estimated speed with the initial restoration speed.

Advantageous Effects of Invention

The present invention can provide the rotary machine controller that can switch the wiring state of the winding quickly and stably during the rotating operation and continue operation even in a device with a large load.

DESCRIPTION OF EMBODIMENTS

Figure 1:
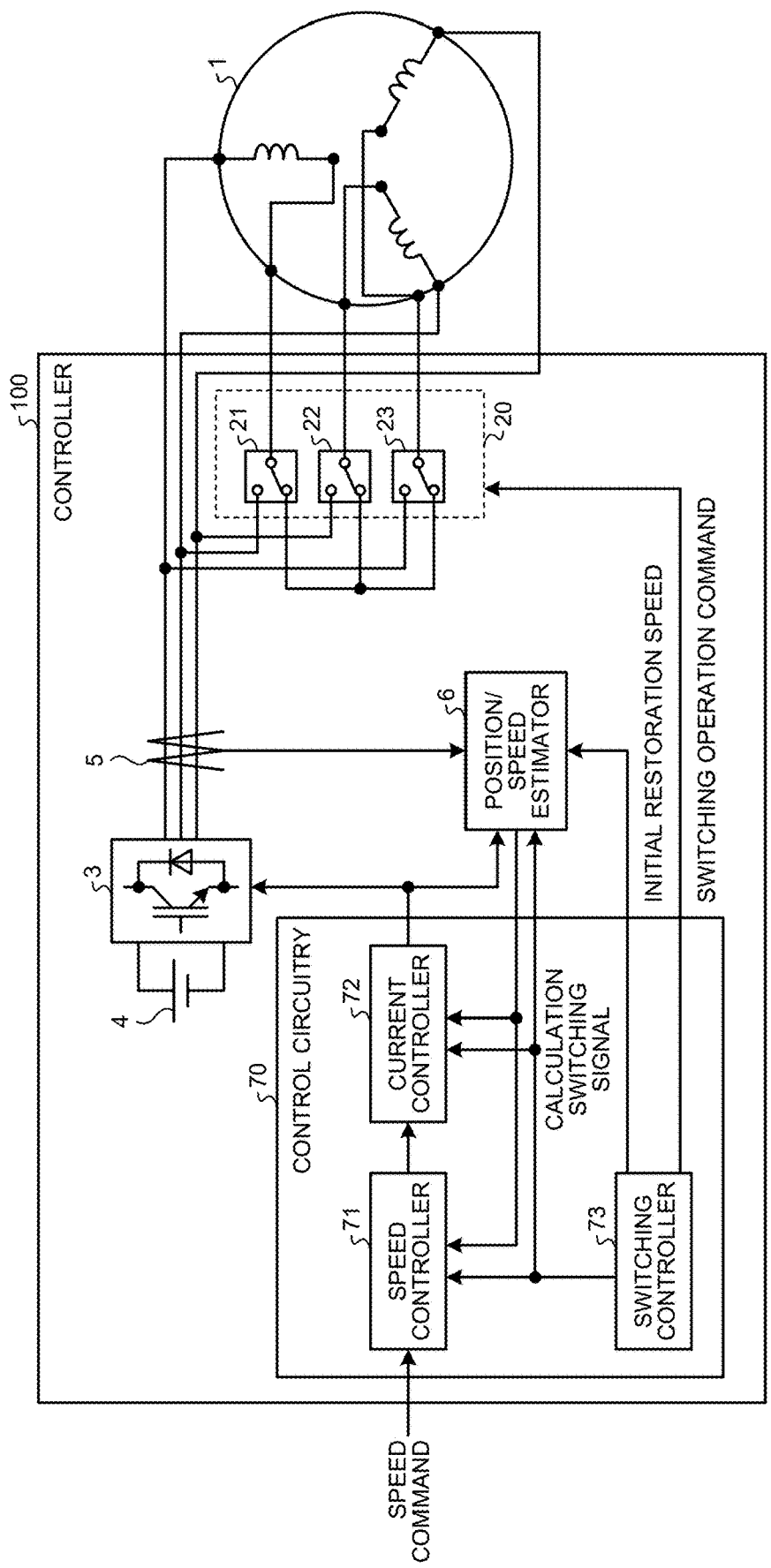
FIG. 1 is a diagram illustrating a configuration of a rotary machine controller according to a first embodiment of the present invention.

Hereinafter, a rotary machine controller, a refrigerant compressor, a refrigeration cycle system, and an air conditioner according to embodiments of the present invention will be described in detail with reference to the drawings. Note that the present invention is not limited to the embodiments. Note that in the following description, components denoted by the same reference numerals have the same or similar functions.

First Embodiment

FIG. 1 is a diagram illustrating a configuration of a rotary machine controller according to a first embodiment of the present invention. Rotary machines are roughly classified into induction machines and synchronous machines. The synchronous machines are classified into: a permanent magnet field synchronous machine in which a permanent magnet is provided on a rotor; a wound field synchronous machine in which a field winding is wound around a rotor; and a reluctance synchronous machine that gains rotational torque using saliency of a rotor. Among these types of the synchronous machines, a synchronous motor 1 of the three-phase permanent magnet field type is connected to a controller 100 that is the rotary machine controller according to the first embodiment.

The controller 100 includes: a connection switch 20 that switches a connection state of windings of the synchronous motor 1; a voltage applicator 3 that supplies power to the synchronous motor 1; a current detector 5 that detects a rotary machine current flowing in the synchronous motor 1; and a position/speed estimator 6. The controller 100 also includes a control circuitry 70 that outputs a voltage command to the voltage applicator 3 and causes the connection switch 20 to switch the connection state of the windings. Note that in the first embodiment, the connection state of the windings means a wiring state of the windings. The wiring state of the windings includes a Y connection and a Δ connection. The Y connection is also called a star connection, and the Δ connection is also called a delta connection. Moreover, the connection state of the windings may be switched between two types or three or more types.

The connection switch 20: includes switchers 21, 22, and 23 that are switching circuits; and switches the connection state of the windings of the synchronous motor 1 by performing a switching operation of the switchers 21, 22, and 23 while the synchronous motor 1 is in a rotating operation. The switchers 21, 22, and 23 may be constituted by mechanical relays or semiconductor switches. In the first embodiment, the switchers 21, 22, and 23 switch the synchronous motor 1 between the Y connection and the Δ connection.

The voltage applicator 3 converts direct current power supplied from a direct current voltage source 4 into alternating current power and outputs the alternating current power to the synchronous motor 1. In the first embodiment, a voltage source inverter is used for the voltage applicator 3. The voltage source inverter is a device that switches and converts a direct current voltage supplied from the direct current voltage source 4 into an alternating current voltage. Note that the voltage applicator 3 is not limited to the voltage source inverter as long as the alternating current power for driving the synchronous motor 1 can be output, and may be a circuit: such as a current source inverter; a matrix converter that converts the alternating current power into alternating current power having different amplitude and frequency; and a multi-level converter in which outputs of a plurality of converters are connected in series or parallel.

The current detector 5 detects a phase current flowing from the voltage applicator 3 to the synchronous motor 1, and outputs current information indicating the value of the phase current detected.

The current detector 5 may be a current line sensor that uses a current transformer for instrument also called a current transformer, or may be a current sensor that uses a shunt resistor. The current detector 5 detects the current in the controller 100 according to the first embodiment. The controller 100 illustrated in FIG. 1 directly detects the phase current flowing in the synchronous motor 1, but the current sensing method is not limited to the configuration that directly detects the phase current, and the phase current flowing in the synchronous motor 1 need only be calculated according to the Kirchhoff's current law. The phase current flowing in the synchronous motor 1 may be detected using, for example, a single-shunt current sensing method that uses a shunt resistor provided on a negative direct current bus of the voltage applicator 3, or a lower arm shunt current sensing method that uses a shunt resistor connected in series with a lower arm of the voltage applicator 3. Note that in the case of the three-phase voltage applicator 3, the lower arm shunt current sensing method uses a shunt resistor connected in series with each of the three lower arms, and thus is also called a three-shunt current sensing method. Moreover, in the case of the three-phase synchronous motor 1, the current sensor need not be installed on all wirings of the three phases because when the current sensor is installed on the wirings of any two phases of the three-phase wirings connected to the synchronous motor 1, the current of the remaining one phase can be calculated by the Kirchhoff's current law. Also, the configuration and arrangement of the current detector 5 can be realized in various forms but are not limited to a specific form.

The position/speed estimator 6 receives current information from the current detector 5. The position/speed estimator 6 also receives a voltage command from a current controller 72. The position/speed estimator 6: uses the current detected by the current detector 5, that is, the phase current flowing in the synchronous motor 1, and the voltage command output from the current controller 72; and outputs an estimated phase that is an estimated value of the magnetic pole position of a rotor of the synchronous motor 1 and an estimated speed that is an estimated value of the speed of the rotor of the synchronous motor 1.

Where various methods exist for estimating the magnetic pole position and the speed of the rotor, the synchronous motor 1 according to the first embodiment determines the electrode position using information indicating speed electromotive force of the synchronous motor 1 at middle or high speed in the entire range of the rotational speed of the rotor. The speed electromotive force is induced power generated inside the synchronous motor 1 due to the rotation of the rotor, and is proportional to the field magnet generated between the rotor and the stator included in the synchronous motor 1, and the rotational speed of the rotor. The method of estimating the magnetic pole position can be exemplified by an arctangent method and adaptive flux observer, but is not limited to a specific method. The controller 100 according to the first embodiment estimates the magnetic pole position using the adaptive flux observer. The adaptive flux observer is recognized as a high-performance speed estimation method because it is robust against fluctuations in the number of flux linkages and does not cause steady speed estimation errors.

The control circuitry 70 includes a speed controller 71, the current controller 72, and a switching controller 73. The current controller 72 is a vector controller that, in order to control the current flowing in the synchronous motor 1, performs coordinate transformation on the current detected by the current detector 5 to obtain a current command value in a dq coordinate system by vector control with a d axis corresponding to the direction of the magnetic flux of a permanent magnet of the rotor included in the synchronous motor 1, and a q axis being an axis orthogonal to the d axis. A typical vector controller performs current control on the dq coordinates with respect to the magnetic pole of the rotor. This is because the conversion of the phase current into a value on the dq coordinates converts the alternating current quantity into a direct current quantity and makes the control easier. In the synchronous motor 1, a q-axis current is proportional to the magnet torque of the synchronous motor 1, so that the q axis is called a torque axis and the q-axis current is called a torque current. In contrast to the q-axis current, a d-axis current causes a change in the magnetic flux generated in the stator and changes the amplitude of the output voltage of the synchronous motor 1, so that the d axis is called a magnetic flux axis and the d-axis current is called a magnetic flux current or an excitation current. In a permanent magnet embedded motor, the d-axis current generates reluctance torque so that not the q-axis current alone acts on the torque, but the q-axis current is generally called the torque current.

The coordinate transformation uses the estimated phase calculated by the position/speed estimator 6. Note that the current controller 72 may use a polar coordinate system such as an αβ stator coordinate system or a γδ coordinate system besides the dq coordinate system in the vector control. The current controller 72 may also adopt direct torque control (DTC) instead of the vector control. However, when the DTC is adopted, the current command needs to be converted into a magnetic flux command and a torque command.

Note that the torque current and the magnetic flux current can be calculated more exactly if the control is performed using not the dq coordinate system but a coordinate system based on the magnetic flux generated from the stator. This coordinate system is called an f-t coordinate system, an n-t coordinate system, or the like and will not be described as it is publicly known. In the first embodiment, the q-axis current is called the torque current, and the d-axis current is called the magnetic flux current, which however does not apply when the control is performed using a coordinate system other than the dq coordinate system or when a reluctance synchronous motor that does not generate magnet torque in principle is used.

Note that the current controller 72 controls the current flowing in the synchronous motor 1 such that the current on the dq coordinates matches the value of the current command. Although a specific method of implementing the current controller 72 is not limited to a particular method, the current controller 72 typically includes a proportional-integral controller and a decoupling controller. The current command may be calculated by speed control or may be input from a host controller. In the first embodiment, the output value of the speed controller 71 is the current command.

The speed controller 71 generates the current command such that an angular speed of the synchronous motor 1 matches the value of a speed command being input. Although a specific method of implementing the speed controller 71 is not limited to a particular method, the speed controller 71 typically uses a proportional-integral controller. Note that the speed controller 71 may generate the current command from the speed command by feedforward, or may use a proportional-integral controller and a feedforward controller together.

The switching controller 73 determines the connection state of the windings of the synchronous motor 1 on the basis of the speed command or the estimated speed, or on the basis of a command input from the outside. When switching the connection state of the windings, the switching controller 73 outputs a switching operation command for switching the contacts of the switchers 21, 22, and 23 to the connection switch 20. Moreover, in order to be able to restart the synchronous motor 1 stably after switching the connection state of the windings, the switching controller 73 outputs an initial restoration speed to the position/speed estimator 6 and outputs a calculation switching signal to the speed controller 71, the current controller 72, and the position/speed estimator 6. Details of the initial restoration speed and the calculation switching signal will be described later.

In the controller 100 illustrated in FIG. 1, the speed controller 71 and the current controller 72 form a voltage command generator that generates the voltage command, but the configuration of the voltage command generator is not limited to the example of FIG. 1. The voltage command generator may be constituted by a current controller that generates a voltage command on the basis of a current command input from the outside.

Advantages of switching the windings of the synchronous motor 1 between the Y connection and the Δ connection will be described. In the Y connection state, the line voltage is denoted as $V_Y$, and the current flowing into the winding is denoted as $I_Y$. Also in the Δ connection state, the line voltage is denoted as $V_Δ$, and the current flowing into the winding is denoted as $I_Δ$. Assuming that the voltages applied to the windings of the phases are equal to one another, the following expressions (1) and (2) hold true.

$$V_Δ = V_Y/\sqrt{3} \tag{1}$$

$$I_Δ = \sqrt{3} \times I_Y \tag{2}$$

When the voltage $V_Y$ and the current $I_Y$ in the Y connection state and the voltage $V_Δ$ and the current $I_Δ$ in the Δ connection state satisfy the relationships of expressions (1) and (2), the power supplied to the synchronous motor 1 is equal in the Y connection state and in the Δ connection state. That is, when the power supplied to the synchronous motor 1 is equal in the Y connection state and in the Δ connection state, the Δ connection state has a larger current flowing into the windings and a lower voltage required for driving.

The above properties can be used to select the wiring state of the windings according to the load condition. For example, low speed operation can be performed in the Y connection state at a low load, and high speed operation can be performed in the Δ connection state at a high load. By doing so, the efficiency at a low load can be improved, and the output at a high load can be increased.

This point will be described in more detail by taking as an example a case where a compressor of an air conditioner is driven by the synchronous motor 1. As the synchronous motor 1 for driving the compressor of the air conditioner, a permanent magnet field synchronous motor is widely used in order to meet the demand for energy saving. Moreover, recent air conditioners perform high speed operation that causes the synchronous motor 1 to be rotated at high speed and quickly bring the room temperature to a set temperature when a difference between the room temperature and the set temperature is large, or perform low speed operation that causes the synchronous motor 1 to be rotated at low speed and maintain the room temperature when the room temperature is close to the set temperature. In the case of such control, a ratio of the time of the low speed operation to the total operation time is higher than a ratio of the time of the high speed operation to the total operation time.

In the synchronous motor 1, the speed electromotive force increases as the rotational speed increases, whereby the voltage value required for driving increases. The speed electromotive force is higher in the Y connection state than in the Δ connection state as described above. In order to reduce the speed electromotive force at high speed, the magnetic force of the permanent magnet can be decreased, or the number of turns of the winding can be decreased. However, in doing so, the current for gaining the same output torque increases so that the current flowing in the synchronous motor 1 and the voltage applicator 3 is increased, and the efficiency is reduced. Moreover, when the voltage value required for driving the synchronous motor 1 becomes higher than the voltage of the direct current voltage source 4 due to the increase in the speed electromotive force, the voltage required for driving the synchronous motor 1 is typically supplied using flux weakening control. However, when flux weakening control is used, a reactive current that does not contribute to the generation of torque flows in the synchronous motor 1 and the voltage applicator 3, so that the efficiency is reduced.

Therefore, the wiring state of the windings of the synchronous motor 1 can be switched according to the rotational speed. For example, when high speed operation is required, the windings of the synchronous motor 1 are set in the Δ connection state. By setting the windings in the Δ connection state, the voltage required for driving can be $1/\sqrt{3}$ times that in the Y connection state. Therefore, the voltage required for driving can be decreased without decreasing the magnetic force of the permanent magnet or decreasing the number of turns of the winding. Also, flux weakening control need not be used.

On the other hand, in low speed rotation, the windings are set in the Y connection state so that the current value can be $1/\sqrt{3}$ times that in the Δ connection state. Furthermore, by designing the synchronous motor 1 to be suitable for driving at low speed when the windings are in the Y connection state, the current value can be reduced as compared to when the windings are in the Y connection state over the entire speed range. This as a result can reduce a loss of the voltage applicator 3 and improve the efficiency.

As described above, it is significant to switch the wiring state of the windings according to the load condition. The controller 100 according to the first embodiment includes the connection switch 20 that switches the wiring state of the windings. For example, when a difference between the room temperature and a set temperature is large, the switching controller 73 sets the windings of the synchronous motor 1 in the Δ connection state and causes high speed operation to be performed until the room temperature becomes close to the set temperature. Once the room temperature becomes close to the set temperature, the switching controller 73 switches the windings of the synchronous motor 1 to the Y connection state and causes low speed operation to be performed.

However, when the synchronous motor 1 drives the compressor of the air conditioner, temporary stoppage of the rotating operation of the synchronous motor 1 for switching the wiring state of the windings increases the torque required for restart and possibly results in a failure to start. Therefore, when the windings are switched by temporarily stopping the rotating operation of the synchronous motor 1, restart needs to be performed after a lapse of a few minutes before the state of the refrigerant is stabilized. However, when restart is performed after the state of the refrigerant is stabilized, the refrigerant cannot be compressed so that the room temperature may not be kept constant due to a reduction in cooling or heating capacity. Therefore, the switching controller 73 preferably switches the wiring state of the windings while the synchronous motor 1 is in the rotating operation.

Figure 2:
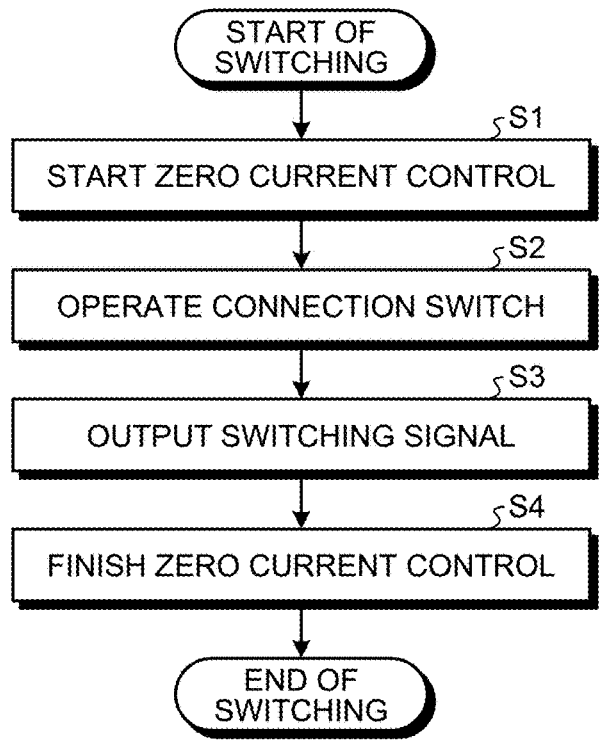
FIG. 2 is a flowchart illustrating a basic sequence for switching a wiring state of windings by a controller according to the first embodiment.

Here, a sequence for switching the wiring state of the windings during the rotating operation will be described. FIG. 2 is a flowchart illustrating a basic sequence for switching the wiring state of the windings by the controller according to the first embodiment. When the synchronous motor 1 remains in steady operation at the time of switching the wiring state of the windings, power is being supplied from the voltage applicator 3 to the synchronous motor 1 so that arc discharge occurs between the contacts of the switchers 21, 22, and 23 at the time of switching of the wiring state of the windings, which may cause a failure such as contact welding.

In order to avoid a failure such as contact welding, when switching the wiring state of the windings, the controller performs control in step S1 that brings the current flowing in the windings of the synchronous motor 1, that is, the value of the current flowing in the switchers 21, 22, and 23, close to zero as much as possible. The control that brings the current flowing in the windings of the synchronous motor 1 close to zero as much as possible will be hereinafter referred to as "zero current control". That is, in step S1, the controller starts the zero current control. During the period of the zero current control, the voltage applicator 3 outputs a voltage that cancels the speed electromotive force of the synchronous motor 1, that is, a voltage whose magnitude and phase match those of the speed electromotive force. As a result, the current flowing through the switchers 21, 22, and 23 can be brought close to zero to be regarded as substantially zero.

During the period of the zero current control, the synchronous motor 1 cannot gain torque and thus slows down. That is, an increase in the period of the zero current control makes it difficult to switch the wiring state of the windings and perform restart during the rotating operation of the synchronous motor 1. It is thus desirable to raise a response of the current controller 72 to an extent that does not result in instability, bring the current flowing through the switchers 21, 22, and 23 close to zero as quickly as possible, and move to a next phase.

Once the zero current control is started, the controller operates the connection switch 20 in step S2. When operating the connection switch 20, the switching controller 73 outputs a switching operation command for switching the contacts of the switchers 21, 22, and 23 to the connection switch 20. Upon receiving the switching operation command, the connection switch 20 operates the switchers 21, 22, and 23 and switches the wiring state of the windings.

After the wiring state of the windings is switched, the controller outputs a switching signal in step S3. In order to be able to restart the synchronous motor 1 stably, the switching controller 73 outputs an initial restoration speed to the position/speed estimator 6 and outputs a calculation switching signal to the speed controller 71, the current controller 72, and the position/speed estimator 6. After the initial restoration speed and the calculation switching signal are output, the processing proceeds to step S4 and ends the zero current control.

The zero current control needs to be ended at a timing when it is certain that the switchers 21, 22, and 23 complete operating in order to prevent a failure such as contact welding of the switchers 21, 22, and 23. The time from when the switching operation command is output to the connection switch 20 to when all the switchers 21, 22, and 23 complete operating is grasped in advance, and a period longer than that time is set as a zero current control period $T_{zero}$. The zero current control period $T_{zero}$ is on the order of milliseconds when the switchers 21, 22, and 23 are constituted by typical mechanical relays, or on the order of a hundred microseconds when the switchers 21, 22, and 23 are constituted by typical semiconductor switches.

Figure 3:
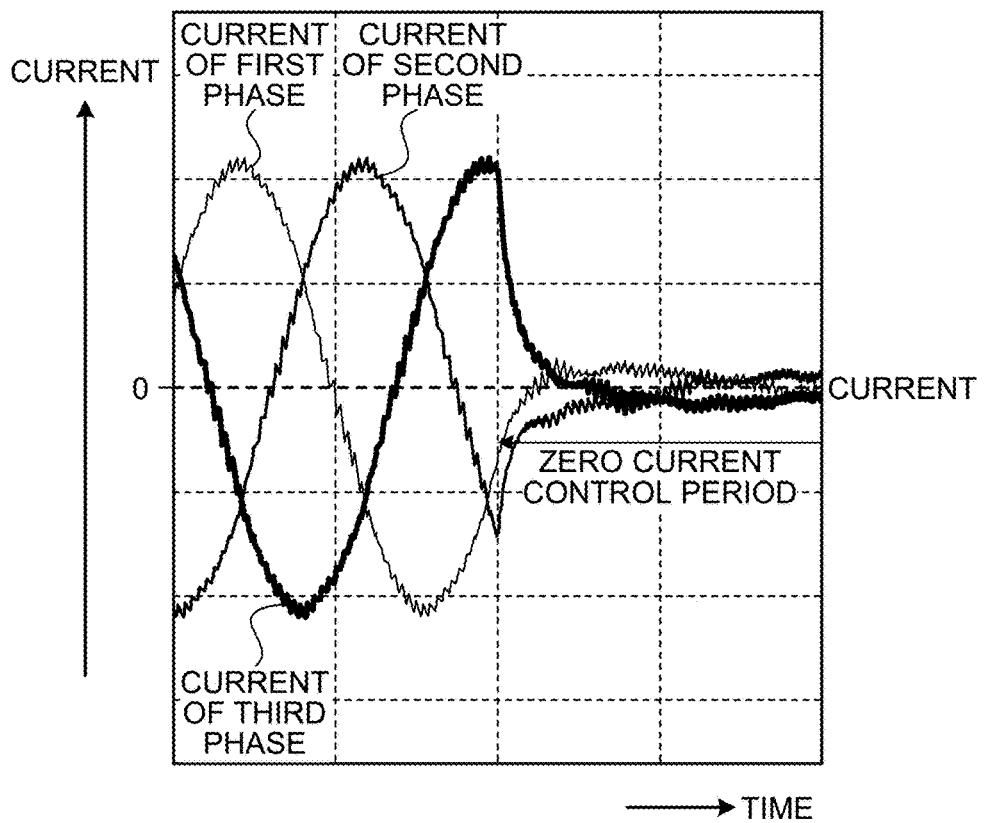
FIG. 3 is a graph illustrating a result of zero current control when the controller according to the first embodiment drives a synchronous motor at a speed that does not require flux weakening control.
Figure 4:
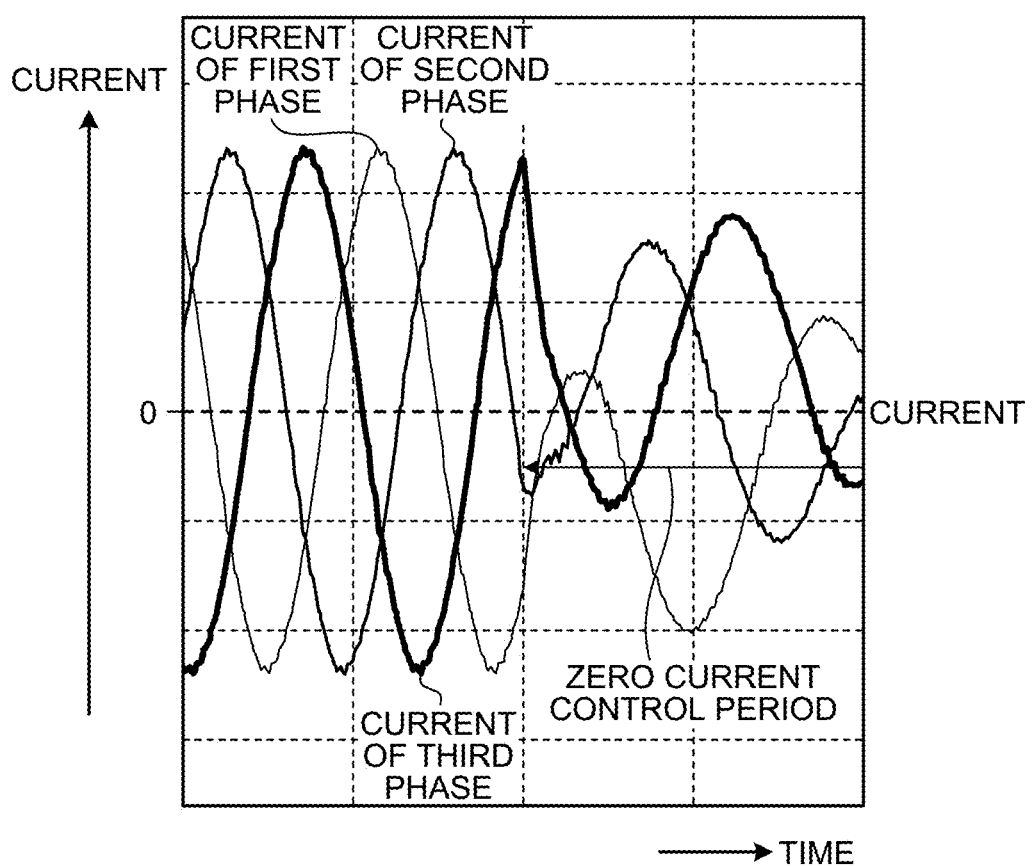
FIG. 4 is a graph illustrating a result of zero current control when the controller according to the first embodiment drives the synchronous motor at a speed that requires flux weakening control.

However, it is necessary to note that the above method cannot bring the values of the current flowing through the switchers 21, 22, and 23 to zero when the synchronous motor 1 rotates at such a high speed that it is driven using flux weakening control, that is, when the speed electromotive force of the synchronous motor 1 is larger than the voltage of the direct current voltage source 4. In other words, it is necessary to note that the voltage required for driving is supplied by flowing the reactive current in the d-axis direction while flux weakening control is performed, but setting the current flowing in the windings of the synchronous motor 1 to zero means that the reactive current cannot be flowed. FIG. 3 is a graph illustrating a result of the zero current control when the controller according to the first embodiment drives the synchronous motor at a speed that does not require flux weakening control. FIG. 4 is a graph illustrating a result of the zero current control when the controller according to the first embodiment drives the synchronous motor at a speed that requires flux weakening control. When the controller 100 drives the synchronous motor 1 at a speed that does not require flux weakening control, the values of the current flowing through the switchers 21, 22, and 23 approach almost zero by the zero current control, whereas, when the controller 100 drives the synchronous motor 1 at a speed that requires flux weakening control, the values of the current flowing through the switchers 21, 22, and 23 cannot be controlled according to the command value even with the zero current control and are not zero. When the connection switch 20 is operated to switch the wiring state of the windings in the state where the controller 100 drives the synchronous motor 1 at a speed that requires flux weakening control, the arc discharge occurs between the contacts of the switchers 21, 22, and 23 and possibly causes a failure such as contact welding.

Figure 5:
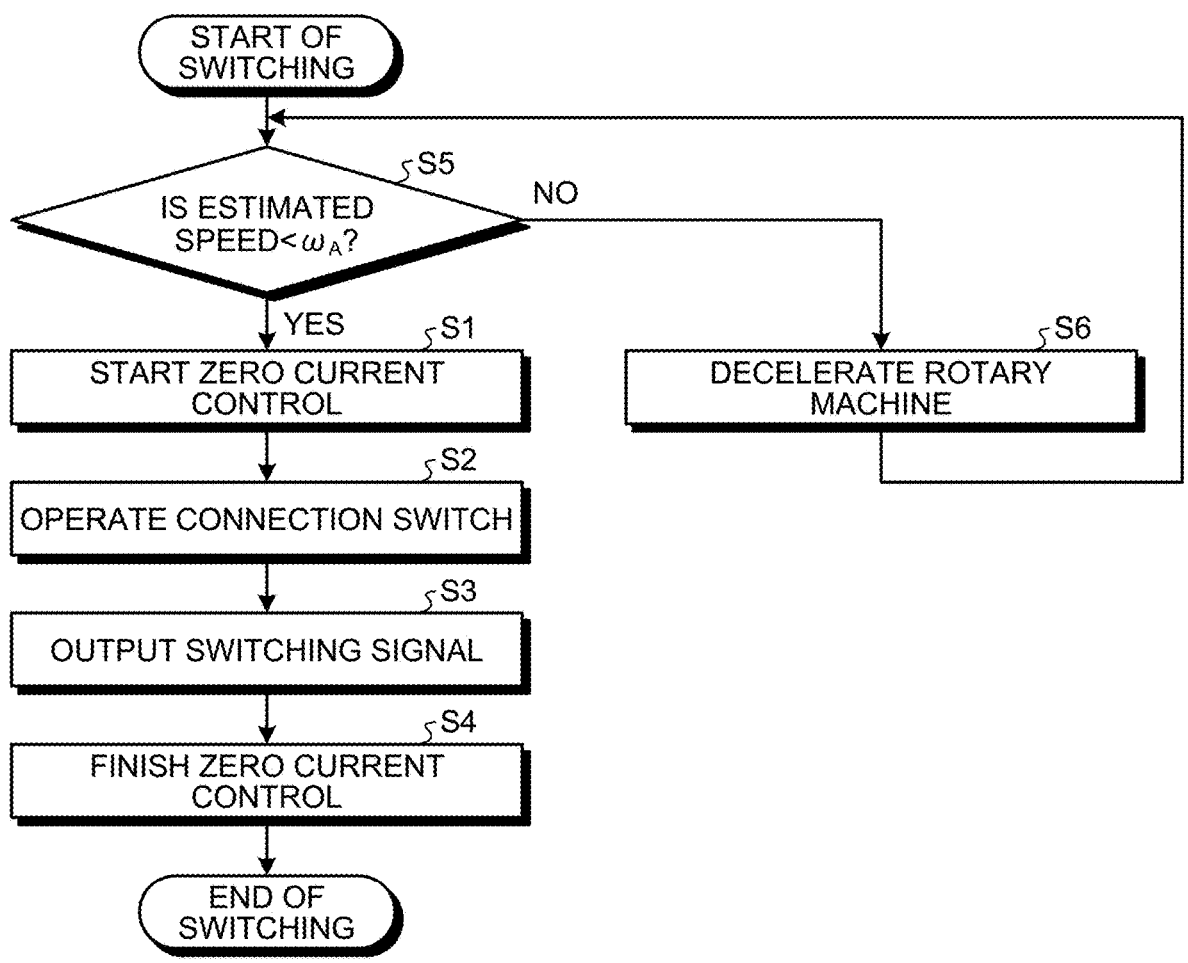
FIG. 5 is a flowchart illustrating a sequence for switching the wiring state of the windings when the controller according to the first embodiment drives the synchronous motor by performing flux weakening control.

FIG. 5 is a flowchart illustrating a sequence for switching the wiring state of the windings when the controller according to the first embodiment drives the synchronous motor by performing flux weakening control. FIG. 5 differs from the flowchart illustrated in FIG. 2 in that steps S5 and S6 are set before step S1. That is, in step S5, it is checked in advance whether an estimated speed of the synchronous motor 1 is lower than a threshold $\omega_A$. If the estimated speed of the synchronous motor 1 is lower than the threshold $\omega_A$ it is determined to be "Yes" in step S5, and the processing proceeds to step S1. If the estimated speed of the synchronous motor 1 is higher than or equal to the threshold $\omega_A$ it is determined to be "No" in step S5 so that, in step S6, the speed of the synchronous motor 1 is decelerated to be lower than the threshold $\omega_A$, and the processing returns to step S5.

The threshold $\omega_A$ for starting the zero current control can be calculated as follows. When the dq-axis current is almost zero, speed electromotive force E is due only to armature flux linkage of the permanent magnet, and the magnitude thereof is expressed by the following expression (3). In expression (3), "ω" represents the speed of the synchronous motor 1, and "Φ" represents an effective value of the armature flux linkage by the permanent magnet on the dq coordinates.

$$E = \omega \times \Phi \quad (3)$$

When "V" represents the magnitude of the voltage output from the direct current voltage source 4, the relationship of the following expression (4) need only be satisfied.

$$E < V \quad (4)$$

From expressions (3) and (4), the threshold $\omega_A$ is determined as in the following expression (5).

$$\omega_A = V/\Phi \quad (5)$$

Upon receiving the calculation switching signal, the speed controller 71 changes a constant of the synchronous motor 1 used for proportional-integral control and an initial value of integral control to match the wiring state of the windings after switching. That is, the speed controller 71 changes a control gain in the proportional-integral control such that the rotary machine current follows the current command. For example, when the windings are switched from the Δ connection state to the Y connection state, the number of flux linkages on the dq coordinates of the synchronous motor 1 in the Y connection state is √3 times that in the Δ connection state. The speed controller 71 thus multiplies the number of flux linkages used for the proportional-integral control by √3. Also in the Y connection state, the current on the dq coordinates required for producing the same torque is 1/√3 times that in the Δ connection state. The speed controller 71 thus performs once the calculation for multiplying the initial value of the integral control by 1/√3. By changing not only the constant of the synchronous motor 1 but also the initial value of the integral control, the switching operation is stabilized with the speed command value being followed more quickly.

Upon receiving the calculation switching signal the current controller 72 changes a control gain determined by the constant of the synchronous motor 1 used for the proportional-integral control and decoupling control to match the wiring state of the windings after switching. That is, the current controller 72 changes the control gain in the proportional-integral control such that the rotary machine current follows the current command. For example, when the windings are switched from the Δ connection state to the Y connection state, the impedance of the synchronous motor 1 in terms of Y connection state used for control in the Y connection state is three times that in the Δ connection state, and the number of flux linkages on the dq coordinates of the synchronous motor 1 in the Y connection state is √3 times that in the Δ connection state. The current controller 72 thus multiplies the impedance of the synchronous motor 1 used for the proportional-integral control and the decoupling control by three, and multiplies the number of flux linkages by √3.

Upon receiving the calculation switching signal, the position/speed estimator 6 changes: the constant of the synchronous motor 1 used for estimation; the magnetic pole position of the synchronous motor 1 estimated; the speed of the synchronous motor 1 estimated; and the number of flux linkages estimated so as to match the wiring state of the windings after switching. For example, when the windings are switched from the Δ connection state to the Y connection state, the impedance of the synchronous motor 1 in terms of Y connection state used for control in the Y connection state is three times that in the Δ connection state. The position/speed estimator 6 thus multiplies the impedance of the synchronous motor 1, used for estimation, by three. Also in the Y connection state, the current phase is advanced by 30 degrees compared to the Δ connection state. The position/speed estimator 6 thus performs once the calculation for advancing the estimated phase by 30 degrees. Also in the Y connection state, the number of flux linkages on the dq coordinates is √3 times that in the Δ connection state. The position/speed estimator 6 thus performs once the calculation for multiplying the number of flux linkages estimated by √3. Here, the change in the current phase is 30° because the switching is performed between the Y connection state and the Δ connection state, however when switching of the wiring state other than the switching between the Y connection state and the Δ connection state is performed in a case where the voltage applicator 3 applies a three-phase alternating current to the synchronous motor 1, the voltage command output from the current controller 72 need only cause a change in the phase in the range of 0° to 120° when the connection state of the windings of the synchronous motor 1 is switched from one connection state to another connection state.

Moreover, upon receiving the initial restoration speed, the position/speed estimator 6 performs estimated speed convergence processing for quickly converging the value of the estimated speed of the synchronous motor 1 to the value of the actual speed.

The necessity of the above estimated speed convergence processing will be described. During the period of the zero current control, the synchronous motor 1 cannot gain torque and thus slows down. In the controller 100 according to the first embodiment that does not have means for directly detecting the phase of the synchronous motor 1, when the phase and speed is estimated and restart is performed while maintaining the current flowing in the synchronous motor 1 around zero after switching of the wiring state of the windings, the synchronous motor 1 undergoes rapid deceleration by the zero current control in the case of a large load, and possibly stops before the estimated values of the phase and speed are stabilized. Alternatively, the estimated response failing to keep up with the deceleration increases an estimation error and possibly causes step-out.

For example, when the synchronous motor 1 drives the compressor of the air conditioner, the zero current control performed during the rotating operation causes loss of torque with a large refrigerant load of N·m order being applied, whereby the synchronous motor 1 stops in a short time of less than a hundred milliseconds. Thus, after the wiring state of the windings of the synchronous motor 1 is switched, it is impossible to wait until the estimation by the position/speed estimator 6 converges and then perform restart.

Therefore, the estimated speed convergence processing is required in which, even when the synchronous motor 1 undergoes rapid deceleration, the estimated speed that is the output of the position/speed estimator 6 quickly converges to a true value by calculation simpler than the estimation from the current flowing in the synchronous motor 1 and the voltage command given to the voltage applicator 3.

The above estimated speed convergence processing is implemented as follows. A slowdown rate Δω is determined by magnitude of the load $T_L$ and magnitude of the moment of inertia J of the synchronous motor 1 as in the following expression (6).

$$\Delta\omega = -T_L/J \qquad (6)$$

Note that the magnitude of the load $T_L$ may be a value obtained by measurement with a measuring instrument such as a torque meter, or may be estimated using the phase current flowing in the synchronous motor 1 and the voltage command output from the current controller 72. The magnitude of the moment of inertia J is usually a value determined at the design stage of the synchronous motor 1, but can be measured when the value of the moment of inertia determined at the design stage is unknown. The magnitude of the moment of inertia J may be measured using a measuring instrument for the moment of inertia, or may be measured in a simple way from acceleration at the time the synchronous motor is rotated without load. Since the simple measurement method is well known, the details thereof will be omitted.

Therefore, an estimated value $\omega_e$ of the speed of the synchronous motor 1 immediately before the end of the zero current control can be calculated by the following expression (7) using an estimated speed $\hat{\omega}_s$ of the synchronous motor 1 before the start of the zero current control, the zero current control period $T_{zero}$, the magnitude of the load $T_L$, and the moment of inertia J of the synchronous motor 1.

$$\hat{\omega}_e = \hat{\omega}_s - (T_L/J) \times T_{zero} \qquad (7)$$

The switching controller 73 gives an initial restoration speed $\hat{\omega}_e$ calculated by expression (7) to the position/speed estimator 6. The position/speed estimator 6 performs once the processing that replaces the calculated estimated speed with the initial restoration speed. During the zero current control, the synchronous motor 1 slows down with no torque generated therein so that, for the initial restoration speed, the initial restoration speed $\hat{\omega}_e$ lower than the estimated speed of the rotary machine is given to the position/speed estimator 6 to be able to cut the time required for the estimated value to converge to the actual speed.

By doing so, the estimation error of the position/speed estimator 6 can be decreased when restart is performed after the end of the zero current control. This, as a result, cuts the time for the estimated phase and the estimated speed that are output from the position/speed estimator 6 to approach true phase and speed values of the synchronous motor 1, and stabilizes the switching operation. Expression (7) used for switching the estimated speed is very simple and has a small calculation load, and thus can be implemented for an inexpensive microcontroller.

By switching the wiring state of the windings in the sequence described above, the switching operation of the switchers 21, 22, and 23 can be performed with no current flowing through the switchers 21, 22, and 23 so that no arc discharge is generated between the contacts of the switchers 21, 22, and 23. Therefore, when mechanical relays are used for the switchers 21, 22, and 23, contact welding can be prevented so that a highly reliable motor driver can be implemented. In other words, the controller 100 according to the first embodiment can reduce an incidence of failure and can prolong the life of the device even when the connection switch 20 includes inexpensive components, whereby the product cost can be reduced.

Moreover, when performing the switching operation of the switchers 21, 22, and 23 during the zero current control period $T_{zero}$, the controller 100 according to the first embodiment does not cause a large change in the current supplied to the windings of the synchronous motor 1 at the time of switching the wiring state of the windings. Therefore, the wiring state of the windings can be switched while suppressing the noise and vibration of the synchronous motor 1, and a high quality product can be provided.

Furthermore, the switching signal is transmitted to the speed controller 71, the current controller 72, and the position/speed estimator 6 at the end of the zero current control, so that the synchronous motor 1 can be restarted stably and that the reliability is improved even in a case where position sensorless control of the synchronous motor 1 is performed and where the load applied to the synchronous motor 1 is large.

Second Embodiment

The configuration of the controller 100 according to a second embodiment of the present invention is similar to that of the controller 100 according to the first embodiment. However, in the controller 100 according to the second embodiment, the voltage applicator 3 stops the output at the time of the zero current control. Therefore, the controller 100 according to the second embodiment can bring the current flowing in the synchronous motor 1 to zero in shorter time and more accurately than the controller 100 according to the first embodiment that causes the voltage applicator 3 to output the voltage whose magnitude and phase match the speed electromotive force. Moreover, the controller 100 according to the second embodiment can bring the current flowing in the synchronous motor 1 to zero even when the speed electromotive force of the synchronous motor 1 is larger than the voltage of the direct current voltage source 4. Therefore, the controller 100 according to the second embodiment can switch the wiring state of the windings in the sequence illustrated in the flowchart of FIG. 2 even when the synchronous motor 1 is rotated at high speed.

In the controller 100 according to the second embodiment, the current flowing in the synchronous motor 1 becomes zero immediately when the zero current control is started so that, immediately thereafter, the switching operation command for switching the contacts of the switchers 21, 22, and 23 is transmitted to the connection switch 20. Upon receiving the switching operation command, the connection switch 20 operates the switchers 21, 22, and 23 and switches the wiring state of the windings.

Third Embodiment

Figure 6:
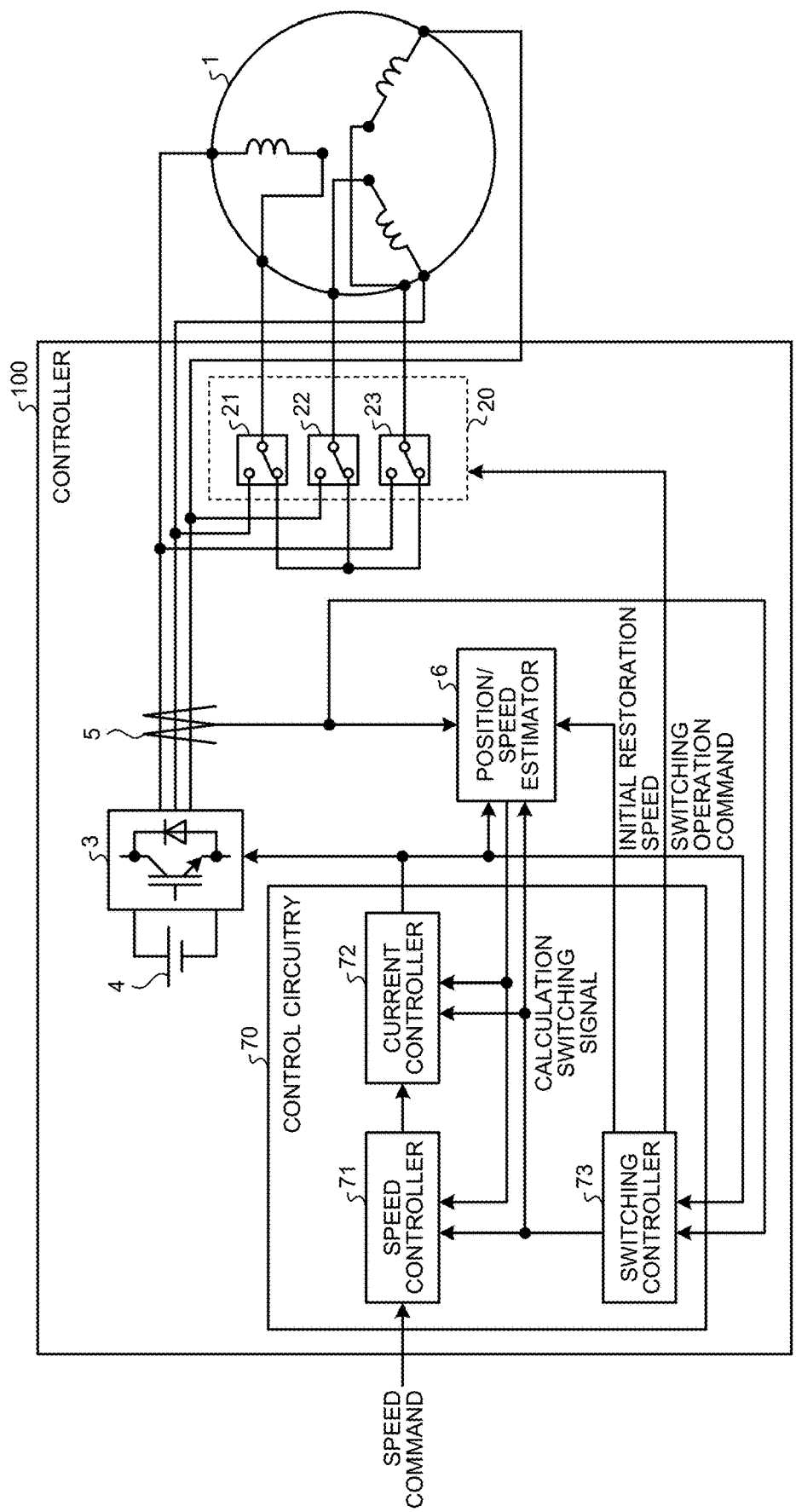
FIG. 6 is a diagram illustrating a configuration of a rotary machine controller according to a third embodiment of the present invention.
Figure 7:
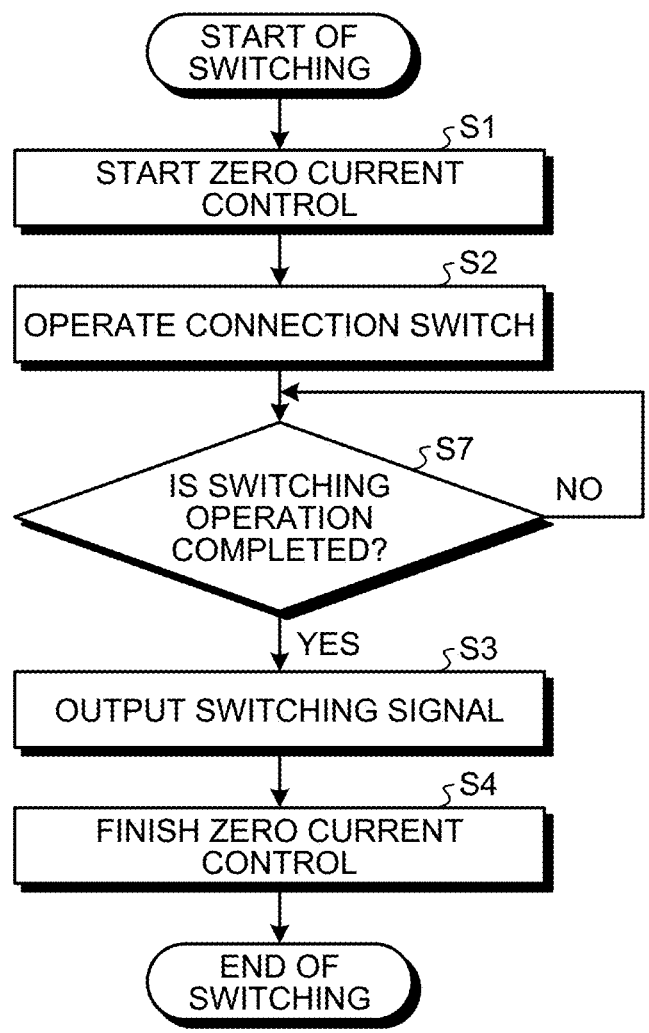
FIG. 7 is a flowchart illustrating a sequence for switching a wiring state of the windings by the controller according to the third embodiment.

FIG. 6 is a diagram illustrating a configuration of a rotary machine controller according to a third embodiment of the present invention. FIG. 7 is a flowchart illustrating a sequence for switching the wiring state of the windings by the controller according to the third embodiment. FIG. 7 is different from the sequence illustrated in FIG. 2 in that step S7 is set between step S2 and step S3. In the controller 100 according to the third embodiment, the zero current control period $T_{zero}$ is a period from when the zero current control is started to when it is detected that all the switchers 21, 22, and 23 complete operating. It is detected that all the switchers 21, 22, and 23 complete operating by using the voltage command given to the voltage applicator 3 and the value of the magnitude of the phase current flowing in the synchronous motor 1 detected by the current detector 5.

The controller 100 according to the third embodiment detects that all the switchers 21, 22, and 23 complete operating by observing a change in a resistance value between the phases or a change in the magnitude of back electromotive force of the synchronous motor 1.

In the controller 100 according to the third embodiment, the switching controller 73 determines in step S7 whether or not all the switchers 21, 22, and 23 complete operating. If at least one of the switchers 21, 22, and 23 does not complete operating, it is determined to be "No" in step S7, and the determination in step S7 is repeated. If all the switchers 21, 22, and 23 complete operating, it is determined to be "Yes" in step S7, and the processing proceeds to step S3. That is, upon detecting that all the switchers 21, 22, and 23 complete operating, the switching controller 73: transmits the initial restoration speed to the position/speed estimator 6 such that the synchronous motor 1 can be stably restarted; transmits the calculation switching signal to the speed controller 71, to the current controller 72, and to the position/speed estimator 6; and ends the zero current control after transmitting the initial restoration speed and the calculation switching signal.

By performing the above operation, the zero current control can be performed for an appropriate period with the zero current control period $T_{zero}$ being neither too long nor too short. If the zero current control period $T_{zero}$ is too long, the synchronous motor 1 decelerates greatly and possibly stops. On the contrary, if the zero current control period $T_{zero}$ is too short, the current flows to the switchers 21, 22, and 23 before the switching operations of all the switchers 21, 22, and 23 are completed, which causes arc discharge between the contacts of the switchers 21, 22, and 23 and possibly leads to a failure. Therefore, it is important to perform the zero current control for an appropriate period in terms of switching the wiring state of the windings while the synchronous motor 1 is in the rotating operation.

Fourth Embodiment

Figure 8:
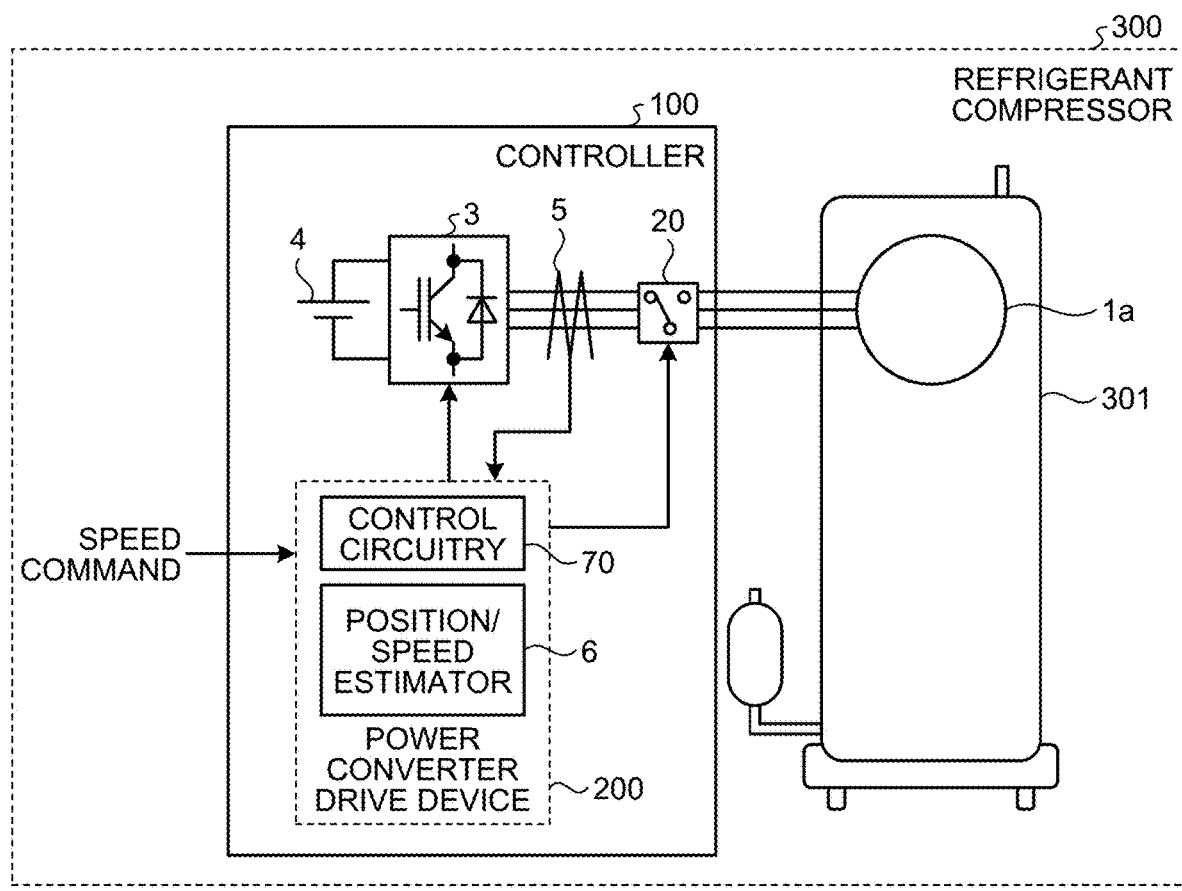
FIG. 8 is a diagram illustrating a configuration of a refrigerant compressor according to a fourth embodiment of the present invention.

FIG. 8 is a diagram illustrating a configuration of a refrigerant compressor according to a fourth embodiment of the present invention. A synchronous motor 1a illustrated in FIG. 8 is a motor subjected to variable speed control by the controller 100 in order to compress refrigerant gas into high-pressure gas in a compressor 301, and is connected to the connection switch 20 for switching the wiring state of the windings of the synchronous motor. The controller 100 is similar to the controller 100 according to the first embodiment. Note that the refrigerant compressor 300 may include the controller 100 similar to that of the second or third embodiment, instead of the controller 100 similar to that of the first embodiment.

The refrigerant compressor 300 illustrated in FIG. 8 includes the controller 100 of the first embodiment, and the controller 100 includes the voltage applicator 3 and a power converter drive device 200. The power converter drive device 200 includes the functions of the control circuitry 70 and the position/speed estimator 6.

As described in the first embodiment, the voltage applicator 3 may basically have any circuit configuration as long as it can supply arbitrary alternating current power to the synchronous motor 1a. Information detected by the current detector 5 is transmitted to the position/speed estimator 6.

Since the compressor 301 compresses the refrigerant gas, a large load is applied to the synchronous motor 1a during driving. A sensor for detecting the magnetic pole position of the synchronous motor 1a is not mounted due to concerns about reduction of reliability and an increase in cost because the sensor is subject to high temperature and high pressure of the compressor 301. The synchronous motor 1a thus decelerates rapidly while the current is not flowed in the synchronous motor 1a for changing the wiring state of the windings of the synchronous motor 1a. In the adaptive flux observer or the arctangent method that is a typical method of estimating the magnetic pole position, the estimated response is slower than the deceleration rate so that the estimation may not be able to be made correctly.

When the sequence for switching the wiring state of the windings described in the first, second, and third embodiments is used for the controller 100 of the refrigerant compressor 300 illustrated in FIG. 8, the value of the estimated speed can be converged to the value of the actual speed of the synchronous motor 1a in a short time even in a state where a large load is applied, whereby restart can be stably performed. Moreover, an arithmetic expression used for quickly converging the estimated speed is very simple and has a small calculation load, and thus can be implemented for an inexpensive microcontroller.

Moreover, the switching operation of the switchers 21, 22, and 23 can be performed with no current flowing through the switchers 21, 22, and 23, so that no arc discharge is generated between the contacts of the switchers 21, 22, and 23. Therefore, when mechanical relays are used for the switchers 21, 22, and 23, contact welding can be prevented so that a highly reliable motor driver can be implemented. In other words, the controller 100 according to the first embodiment can reduce an incidence of failure and prolong the life of the device even when the connection switch 20 includes inexpensive components, whereby the product cost can be reduced.

Moreover, the refrigerant compressor 300 of the fourth embodiment can be implemented by rewriting software of an existing refrigerant compressor that temporarily stops the motor in switching the windings of the motor. Therefore, the refrigerant compressor 300 that switches the wiring state of the windings during the rotating operation and continues operation can be obtained while preventing or reducing an increase in cost.

Fifth Embodiment

Figure 9:
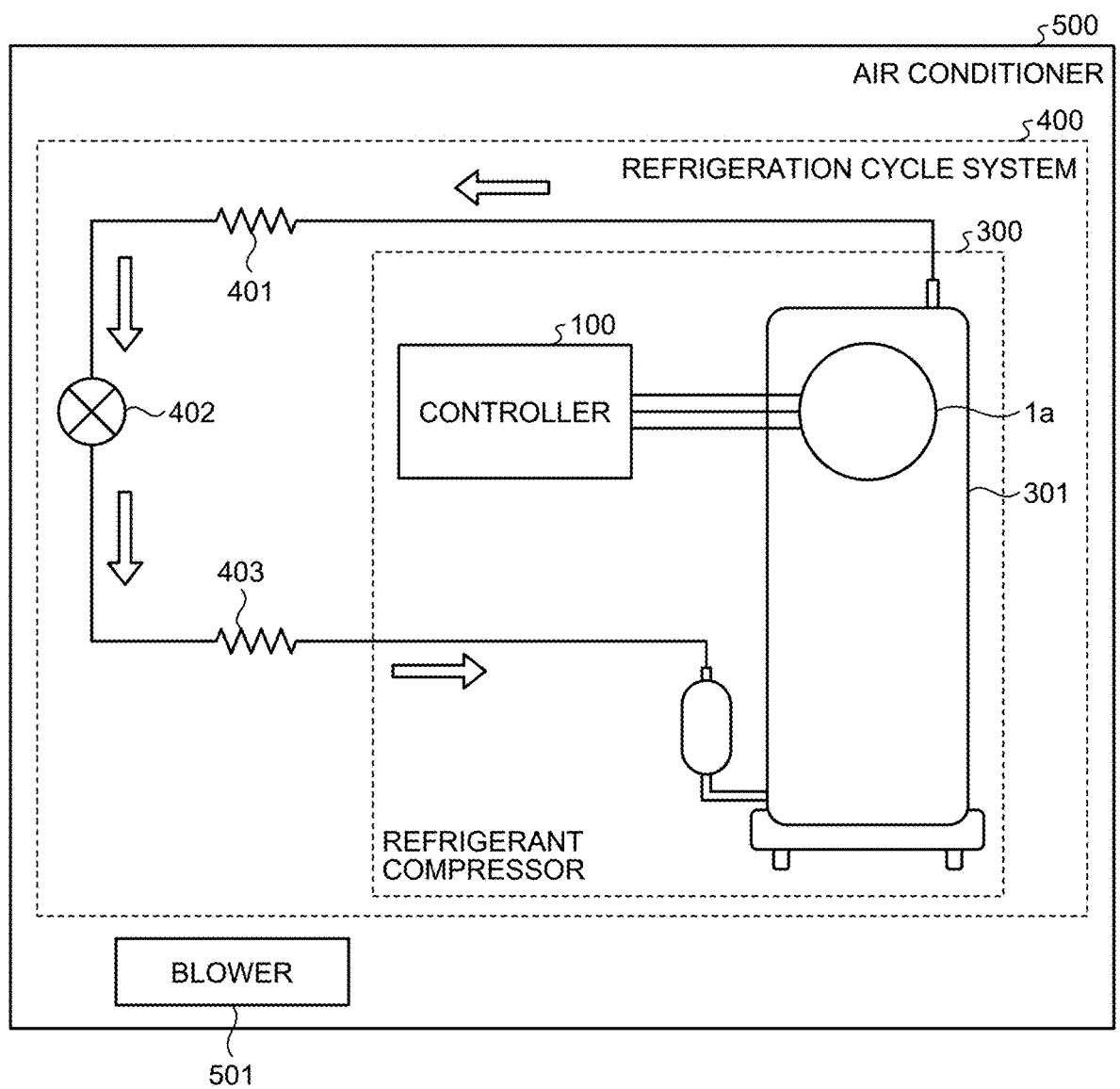
FIG. 9 is a diagram illustrating a configuration of an air conditioner according to a fifth embodiment of the present invention.

FIG. 9 is a diagram illustrating a configuration of an air conditioner according to a fifth embodiment of the present invention. An air conditioner 500 includes a refrigeration cycle system 400. The refrigeration cycle system 400 according to the fifth embodiment includes the refrigerant compressor 300, a condenser 401, an expansion valve 402, and an evaporator 403. The compressor 301 and the condenser 401 are connected by piping. Similarly, the condenser 401 and the expansion valve 402 are connected by piping, the expansion valve 402 and the evaporator 403 are connected by piping, and the evaporator 403 and the compressor 301 are connected by piping. Accordingly, the compressor 301, the condenser 401, the expansion valve 402, and the evaporator 403 form a refrigerant circuit in which a refrigerant circulates. Note that although not illustrated in FIG. 9, the controller 100 includes the current detector 5, the position/speed estimator 6, and the control circuitry 70 illustrated in FIG. 1.

The refrigeration cycle system 400 repeatedly performs steps of evaporation, compression, condensation, and expansion of the refrigerant. The refrigerant changes from liquid to gas, and further changes from gas to liquid, whereby heat exchange is performed between the refrigerant and the outside air. Therefore, the air conditioner 500 can be formed by combining the refrigeration cycle system 400 and a blower 501 for circulating the outside air.

The evaporator 403 exerts a cooling action by evaporating the refrigerant liquid in a low pressure state and removing heat from the air around the evaporator 403. To condense the refrigerant, the compressor 301 compresses the refrigerant gas gasified by the evaporator 403 and turns it into high-pressure gas. The condenser 401 condenses the high-pressure refrigerant gas by releasing the heat of the refrigerant gas whose temperature is increased in the compressor 301, and converts it into the refrigerant liquid. The expansion valve 402 causes the refrigerant liquid to undergo throttle expansion and converts the refrigerant liquid into low-pressure liquid so that the refrigerant can be evaporated by the evaporator 403.

Moreover, the air conditioner 500 is required not only to provide comfort but also to be highly efficient as the energy saving regulations are strengthened year by year. It is thus important that the refrigeration cycle system 400 operates the synchronous motor 1a with high efficiency in a wide speed range from low speed to high speed, and therefore switching the wiring state of the windings of the synchronous motor 1a on the basis of the rotational speed can reduce the loss of the voltage applicator 3 and is significant.

For example, when a difference between the room temperature and a set temperature is large, the synchronous motor 1a is set to the Δ connection and performs high speed operation until the room temperature becomes close to the set temperature. Once the room temperature becomes close to the set temperature, the synchronous motor 1a is switched to the Y connection and performs low speed operation. However, when the synchronous motor 1a drives the compressor 301 of the refrigeration cycle system 400 as in the fifth embodiment, temporary stoppage of the rotating operation of the synchronous motor 1a for switching the windings increases the torque required for restart and possibly results in a failure to start. It is thus necessary to perform restart after a lapse of a few minutes until the state of the refrigerant is sufficiently stabilized. This however makes it impossible to compress the refrigerant for a few minutes for which the compressor 301 is stopped, so that the room temperature may not be kept constant due to a reduction in cooling or heating capacity. Therefore, it is desirable to switch the windings during the rotating operation.

The refrigeration cycle system 400 according to the fifth embodiment uses the controller 100 described in the first to fourth embodiments, and thus can perform switching while in operation without the switching operation of the wiring state of the windings becoming unstable even when a large load is applied. As a result, highly efficient operation can be performed in a wide speed range while maintaining comfort. Moreover, an arithmetic expression used for quickly converging the estimated speed according to the present invention is very simple and has a small calculation load, and thus can be implemented for an inexpensive microcontroller. Also, contact welding can be prevented even with the use of inexpensive mechanical relays for the switchers 21, 22, and 23 that switch the wiring state of the windings of the synchronous motor 1a, so that the overall product cost can be reduced.

Note that the controller 100 according to the first to third embodiments can stably drive the rotary machine even without a position sensor and with a large load, and thus can be applied to all kinds of equipment besides the refrigerant compressor 300 and the refrigeration cycle system 400 and is valuable for the development of industry.

The functions of the control circuitry 70 and the position/speed estimator 6 of the controller 100 according to the above first, second, or third embodiment are implemented by processing circuitry. The processing circuitry may be dedicated hardware or a processing device that executes a program stored in a storage device.

Figure 10:
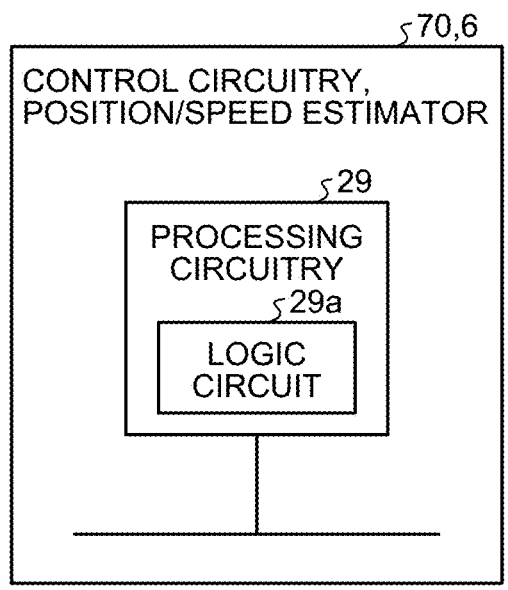
FIG. 10 is a diagram illustrating a configuration in which the functions of a control circuitry and a position/speed estimator of the controller according to the first, second, or third embodiment are implemented by hardware.

When the processing circuitry is the dedicated hardware, the processing circuitry corresponds to a single circuit, a composite circuit, a programmed processor, a parallel programmed processor, an application specific integrated circuit, a field programmable gate array, or a combination thereof. FIG. 10 is a diagram illustrating a configuration in which the functions of the control circuitry and the position/speed estimator of the controller according to the first, second, or third embodiment are implemented by hardware. Processing circuitry 29 incorporates a logic circuit 29a that implements the functions of the control circuitry 70 and the position/speed estimator 6.

When the processing circuitry 29 is a processing device, the functions of the control circuitry 70 and the position/speed estimator 6 are implemented by software, firmware, or a combination of software and firmware.

Figure 11:
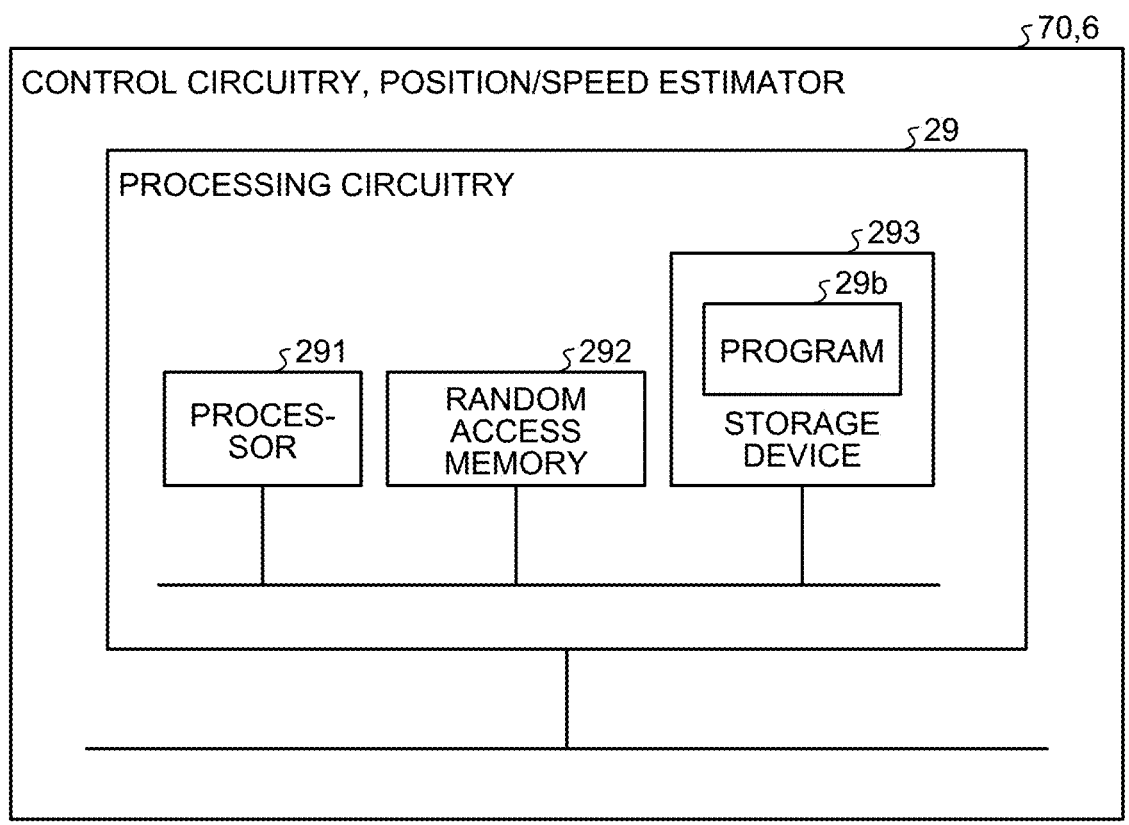
FIG. 11 is a diagram illustrating a configuration in which the functions of the control circuitry and the position/speed estimator of the controller according to the first, second, or third embodiment are implemented by software.

FIG. 11 is a diagram illustrating a configuration in which the functions of the control circuitry and the position/speed estimator of the controller according to the first, second, or third embodiment are implemented by software. The processing circuitry 29 includes a processor 291 that executes a program 29b, a random access memory 292 used by the processor 291 as a work area, and a storage device 293 that stores the program 29b. The functions of the control circuitry 70 and the position/speed estimator 6 are implemented by the processor 291 expanding the program 29b stored in the storage device 293 in the random access memory 292 and executing the program. The software or firmware is described in a program language and stored in the storage device 293. The processor 291 includes, but is not limited to, a central processing unit. The storage device 293 can use a semiconductor memory such as a random access memory (RAM), a read only memory (ROM), a flash memory, an erasable programmable read only memory (EPROM), or an electrically erasable programmable read only memory (EEPROM (registered trademark)). The semiconductor memory may be a non-volatile memory or a volatile memory. Besides the semiconductor memory, the storage device 293 can use a magnetic disk, a flexible disk, an optical disc, a compact disc, a mini disc, or a digital versatile disc (DVD). Note that the processor 291 may output or store data such as a calculation result to/in the storage device 293, or may store the data in an auxiliary storage device (not shown) via the random access memory 292.

The processing circuitry 29 implements the functions of the control circuitry 70 and the position/speed estimator 6 by reading and executing the program 29b stored in the storage device 293. It can also be said that the program 29b causes a computer to execute the procedure and method for implementing the functions of the control circuitry 70 and the position/speed estimator 6.

Note that the processing circuitry 29 may be implemented partly by dedicated hardware and partly by software or firmware.

The processing circuitry 29 can thus implement the aforementioned functions by hardware, software, firmware, or a combination of these.

The configuration illustrated in the above embodiments merely illustrates an example of the content of the present invention, and can thus be combined with another known technique or partially omitted and/or modified without departing from the scope of the present invention.

REFERENCE SIGNS LIST 1, 1a synchronous motor; 3 voltage applicator; 4 direct current voltage source; 5 current detector; 6 position/speed estimator; 20 connection switch; 21, 22, 23 switcher; 29 processing circuitry; 29a logic circuit; 29b program; 70 control circuitry; 71 speed controller; 72 current controller; 73 switching controller; 100 controller; 200 power converter drive device; 291 processor; 292 random access memory; 293 storage device; 300 refrigerant compressor; 301 compressor; 400 refrigeration cycle system; 401 condenser; 402 expansion valve; 403 evaporator; 500 air conditioner; 501 blower.

The invention claimed is:

1. A rotary machine controller comprising:
a connection switch including a switcher to switch a connection state of a winding of a rotary machine by performing a switching operation of the switcher during a rotating operation of the rotary machine;
a current detector to detect a rotary machine current flowing in the rotary machine;
a position/speed estimator to estimate a magnetic pole position and speed of a rotor of the rotary machine on the basis of the rotary machine current;
a voltage applicator to apply a voltage to the rotary machine; and
a control circuitry to generate a voltage command that is given to the voltage applicator on the basis of the magnetic pole position and the speed estimated by the position/speed estimator, and output a switching operation command for switching the connection state to the connection switch, wherein
the control circuitry generates the voltage command to bring the rotary machine current close to zero before the connection state of the winding of the rotary machine is switched and, after the connection state of the winding of the rotary machine is switched, outputs an initial restoration speed determined on the basis of the estimated speed of the rotary machine before switching to the position/speed estimator, and
the position/speed estimator receives the initial restoration speed and replaces the estimated speed with the initial restoration speed.

2. The rotary machine controller according to claim 1, wherein the control circuitry calculates the initial restoration speed output to the position/speed estimator on the basis of acceleration when the rotary machine current is brought close to zero.

3. The rotary machine controller according to claim 1, wherein,
after the connection state of the winding of the rotary machine is switched, the control circuitry outputs, to the position/speed estimator, a calculation switching signal for changing a constant, a phase, and the number of flux linkages of the rotary machine used for estimation on the basis of the connection state of the winding of the rotary machine after switching, and
the initial restoration speed is lower than the estimated speed of the rotary machine.

4. The rotary machine controller according to claim 1, wherein switching of the connection state is switching between a Y connection state and a Δ connection state.

5. The rotary machine controller according to claim 1, wherein the control circuitry includes a voltage command generator to generate the voltage command such that the rotary machine current matches a current command that is a target value of the rotary machine current, and after the connection state of the winding of the rotary machine is switched, a control gain of the voltage command generator is changed such that the rotary machine current follows the current command.

6. The rotary machine controller according to claim 5, wherein the voltage command generator includes a speed controller to generate the current command, and a current controller to generate the voltage command on the basis of the current command.

7. The rotary machine controller according to claim 5, wherein the voltage command generator includes a current controller to generate the voltage command on the basis of the current command given from the outside.

8. The rotary machine controller according to claim 5, wherein switching of the connection state is switching between a Y connection state and a Δ connection state.

9. The rotary machine controller according to claim 8, wherein the voltage command generator generates the voltage command by proportional-integral control, and multiplies an initial value of integral control of the voltage command generator by $\sqrt{3}$ or $1/\sqrt{3}$ when the connection state of the winding of the rotary machine is switched from one connection state to another connection state.

10. The rotary machine controller according to claim 5, wherein the voltage command generator changes a phase of the voltage command in the range of 0° to 120° when the connection state of the winding of the rotary machine is switched from one connection state to another connection state.

11. A refrigerant compressor comprising a compressor to compress a refrigerant by rotation of the rotary machine, and the rotary machine controller according to claim 1.

12. A refrigeration cycle system comprising the refrigerant compressor according to claim 11.

13. An air conditioner comprising the refrigeration cycle system according to claim 12.

* * * * *